es Patent [19]

United States Patent [19]

Wilson

[11] Patent Number: 4,603,613
[45] Date of Patent: Aug. 5, 1986

[54] HOLLOW FORMED BAND SAW FOR INDUSTRIAL BAND MILL

[76] Inventor: Harry Wilson, Rte. #5, Box 111, Selinsgrove, Pa. 17870

[21] Appl. No.: 737,090

[22] Filed: May 23, 1985

Related U.S. Application Data

[63] Continuation-in-part of Ser. No. 535,296, Sep. 23, 1983, abandoned.

[51] Int. Cl.[4] ............................................. B27B 33/06
[52] U.S. Cl. ......................................... 83/661; 83/635
[58] Field of Search ........................... 83/661, 835, 788

[56] References Cited

U.S. PATENT DOCUMENTS

| | | | |
|---|---|---|---|
| 341,989 | 5/1886 | Atkins | 83/661 |
| 346,565 | 8/1886 | Simonds | 83/661 |
| 378,203 | 2/1888 | Lohman | 83/835 |
| 1,786,444 | 12/1930 | Muehlen | 76/27 |
| 2,734,533 | 2/1956 | Roberts | 83/661 |
| 2,787,299 | 4/1957 | Anderson | 83/661 |
| 4,160,397 | 7/1979 | Bertini | 83/661 |

FOREIGN PATENT DOCUMENTS

| | | | |
|---|---|---|---|
| 611898 | 4/1935 | Fed. Rep. of Germany | 83/835 |
| 1126700 | 11/1956 | France | 83/835 |
| 1126700 | 11/1956 | France | 83/835 |

*Primary Examiner*—Frank T. Yost
*Assistant Examiner*—Hien H. Phan
*Attorney, Agent, or Firm*—Leonard Bloom

[57] ABSTRACT

A band saw for an industrial band mill is hollow formed, preferably on both sides thereof, and substantially from edge to edge thereof. This hollow forming eliminates the need for prestressing the band saw by roll tensioning during its manufacture. When the wheels are strained up, the band saw becomes substantially flat on the wheels. Additionally, the band saw may be made thinner to reduce material costs and to result in a thinner saw cut, thereby reducing sawdust waste. Less friction between the band saw and the timber being cut reduces heat build-up, thereby improving the useful life and reliability of the band saw, and facilitating faster cutting rates for improved production efficiency. Preferably, the cutting teeth are swaged set. The band saw may be single edged or double edged and may be mounted in a band mill having either flat or crowned wheels.

6 Claims, 10 Drawing Figures

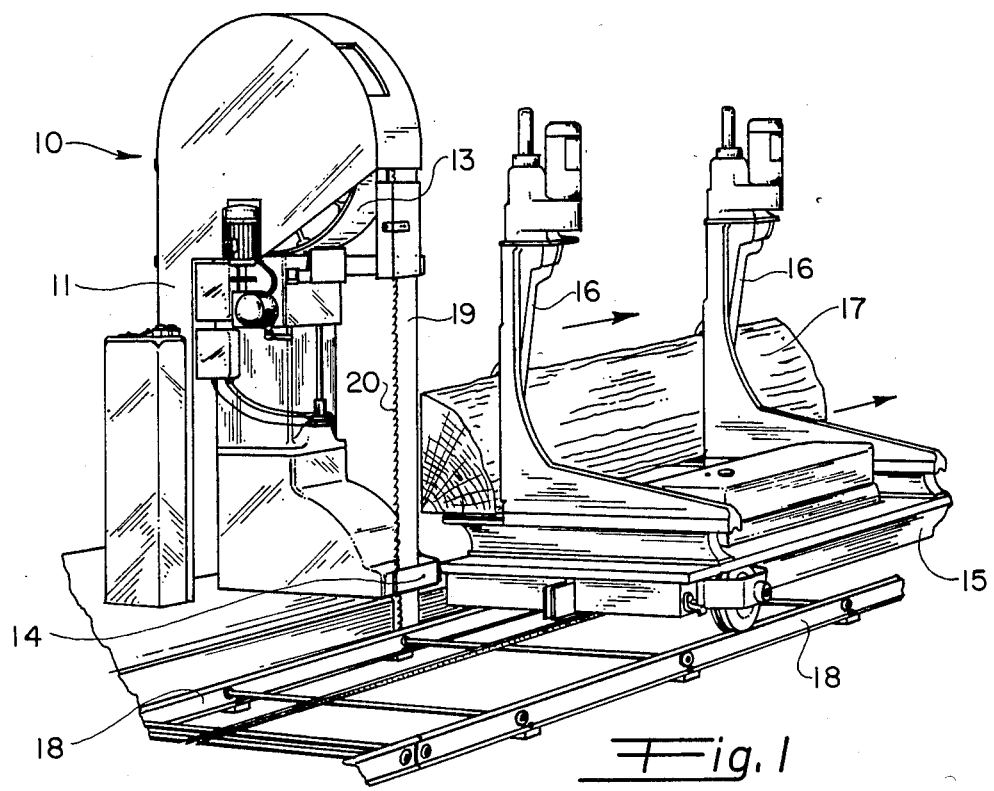
Fig. 1
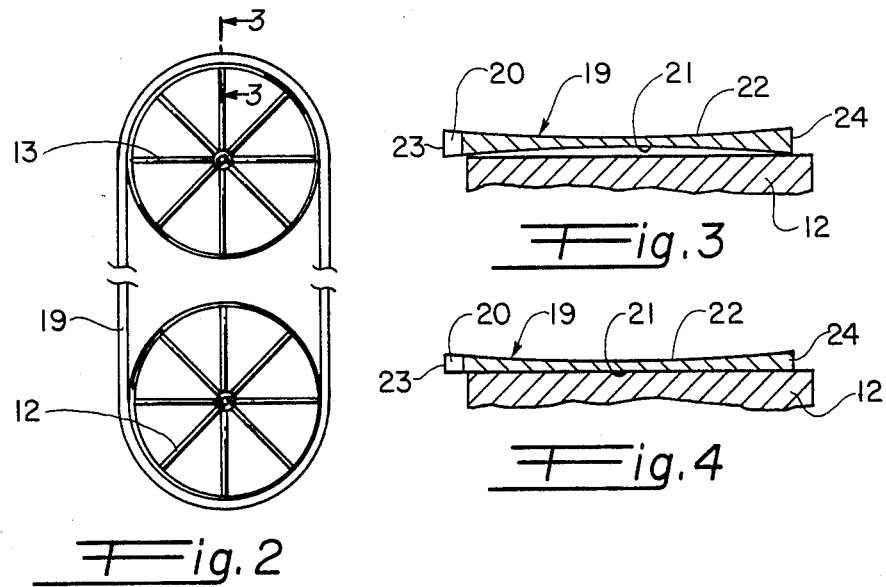
Fig. 2
Fig. 3
Fig. 4

HOLLOW FORMED BAND SAW FOR INDUSTRIAL BAND MILL

CROSS-REFERENCE TO RELATED APPLICATION

The present application is a continuation-in-part of application Ser. No. 535,296 filed Sept. 23, 1983 and entitled, "SAW BLADE CONSTRUCTION", and now abandoned.

FIELD OF THE INVENTION

The present invention relates to a band saw or sash-type gang saw, and more particularly, to a band saw (or blade) intended for use with an industrial band mill.

BACKGROUND OF THE INVENTION

An industrial band mill has a pair of wheels, usually constituting a driving wheel and a driven wheel. These wheels are arranged vertically and support a driven band saw therebetween. In a typical machine, the wheels may be up to ten feet in diameter and fifteen inches wide; and the band saw may be up to sixty feet long, sixteen inches wide, and 0.095 inches thick. The ends of the band saw are butt welded to form a continuous band, and the band saw may be provided with teeth on both sides. The wheels are "strained up", that is, moved apart to strain the band saw on the wheels; and in an industrial band mill, the strain on the wheels could be between 14,000 to 20,000 pounds. The band saw has a tensile strength of around 270,000 pounds per square inch ("psi") and travels around the wheels at speeds of up to 10,000 feet per minute. This equipment is intended for heavy-duty involving logs or large timbers, such as in sawmills, factories producing wood products, and other industrial installations.

In the manufacture and use of band saws in band mills and the like, one of the most important criteria is the proper tensioning of the band to provide a desired flexibility along the leading cutting edge of the band saw. Accordingly, band saw fabrication techniques (as well as sash gang saws) require that the linear length of the leading edge or cutting portion of the band saw be of lesser magnitude than the trailing edge remote therefrom. To provide this characteristic, the band saw is roll-tensioned in its manufacture and during its maintenance so as to stretch the material of the band saw. This roll tensioning of band saws was initiated around 1900.

As a result, the noncutting or trailing edge has a substantially convex contour, commonly referred to as a "crown". In this manner, when the band saw is appropriately strained up between the wheels, the leading cutting edge receives the initial stretching and is therefore the most taut. Ideally, the leading edge most closely approximates a straight line when properly strained up. To attain this driving blade flexure, one of the wheels is operatively connected to an air, hydraulic or mechanical straining device which keeps the blade taut but displaced in the presence of sawing variables, such as depth of cut, feed rate, species, moisture content, density, etc.

Recommended maintenance of band mills requires removal of the band saw after about four (4) hours of continuous duty for re-sharpening and re-tensioning. Tensioning of a band saw, either during original manufacture or maintenance thereof, is a critical operation requiring highly-skilled specialized craftsmen. The craftsman performing this function in a saw mill is called a "filer". The filer's skills are in the nature of trade secrets and are often handed down from one generation to another.

As an objective, the leading or cutting edge of the band saw should define a straight line. A further objective is to assure that the band saw is flush on the wheels, when the wheels are strained up on the band mill. In checking to determine whether the band saw is flush on the strained-up wheels, the filer will often tap the band saw on the wheels to locate any "hollow" sounds. The practice of some filers is to increase the amount of tension to make the edges of the band saw tighter on the wheels. As a result, however, tremendous strain is concentrated on the edges of the band saw; these strains are excessive and result in reduced flex life and, ultimately, destruction of the band saw steel.

To alleviate these inherent structural and tensioning problems, and to obtain a desired degree of useful life and reliability of the band saw, the prior art has resorted to increasing the thickness of the band saw. However, this causes a wider kerf to be cut in the timbers, which thus results in proportionately more sawdust and wasted material.

It should be recognized, moreover, that timber conservation is a critical concern. Virgin forests in the United States and other countries are rapidly vanishing. On the average, the price of finished or sawn lumber has increased by approximately 1.7% each year since 1900, while the cost of standing live trees has increased approximately 3.5% each year. Moreover, with vanishing virgin forests, the diameter of harvested trees is substantially less than it was even thirty years ago. Accordingly, there exists a long-felt but heretofore unsatisfied need to improve the efficiency of wood processing. As a rule of thumb in the lumber industry, a reduced loss of merely 0.010 inches per saw cut equals a savings of around fifty cents ($0.50) to one dollar ($1.00) per thousand board feet of lumber produced. By reducing the size of the kerf by merely 0.031 inches, the amount of wood saved (by not being reduced to sawdust) would result in an increase in lumber yield of from one to three per cent (1–3%) with no associated increase in log costs. In many large mills, this would equate to an additional profit of about $280,000.00 annually. Thus, the relative thickness of the saw blade may have an important impact on the profitability of a sawmill.

Accordingly, a further objective is to make the band saw as thin as possible. There are two reasons for this: one, there would be an associated reduction in the amount of steel used in fabricating the band saw, thus obtaining a cost and weight advantage, as well as resulting in a minimal amount of surface area exposed adjacent to the wood for heat build-up; and two, a band saw which approximates zero thickness would result in less wood removal (in the form of sawdust) generated during the cutting operations. This would provide a substantial increase in the amount of usable board feet during each cut and would translate into a substantial savings in a large volume sawmill.

As further background, the following prior art patents are interesting relative to the present invention:

| Inventor(s) | U.S. Pat. No. | Year of Issue |
| --- | --- | --- |
| Atkins | 341,989 | 1886 |
| Simonds | 345,565 | 1886 |
| Muehlen | 1,786,444 | 1930 |
| Anderson | 2,787,299 | 1957 |

| Inventor(s) | U.S. Pat. No. | Year of Issue |
|---|---|---|
| Bertini | 4,160,397 | 1979 |

Briefly, the Atkins '989 patent discloses a band saw having a recess in the blade to cooperate with a crowned wheel for "tracking" purposes. While Atkins' blade is hollow formed, it is not hollow formed from edge to edge. Secondly, Atkins' purpose in hollow forming is for tracking and not for the elimination of roll tensioning. Basically, roll tensioning was not in commercial use at the time of Atkins' disclosure. Additionally, the Anderson '299 patent uses a flat wheel and discloses a band saw having a uniform thickness; it is not hollow formed, and therefore it must be roll tensioned.

SUMMARY OF THE PRESENT INVENTION

Accordingly, it is a basic object of the present invention to provide an improved band saw for an industrial band mill, wherein the disadvantages and deficiencies of the prior art are substantially eliminated.

It is another object of the present invention to provide a hollow (or concavely) formed band saw which eliminates the necessity for roll tensioning the band saw in its manufacture or during the maintenance thereof.

It is another object of the present invention to assure that the tension on the band saw is formed as a gradient having the greatest amount of tension on the cutting edge of the blade, thereby defining a linear cutting edge.

It is yet another object of the present invention to substantially eliminate the need for pre-tensioning of the band saw and allowing the band saw to assume its most beneficial profile when installed on the band mill, thereby obviating the need for crowned wheels (which are somewhat difficult to manufacture) and thereby allowing the band saw to assume a natural pattern of stresses; this will substantially reduce the metal fatigue associated with the pre-tensioned band saws of the prior art, thereby extending the "flex-life" of the band saw without substantially reducing the elasticity thereof.

It is a further object of the present invention to provide relatively-thinner band saws for a band mill, thereby reducing the width of the kerf, and thereby reducing the amount of sawdust for a proportional, and substantial, costs savings.

It is a still further object of the present invention to provide an improved hollow formed band saw having a swaged set of adjacent teeth and associated gullets which efficiently reduce friction and heat build-up, yet facilitate the removal of small wood chips and saw dust.

In accordance with the teachings of the present invention, there is herein illustrated and described, an improved band saw for an industrial band mill; wherein the band mill has a plurality of wheels, at least one of which may constitute a driving wheel; wherein means are provided for moving the wheels in a direction substantially away from one another, that is, straining up the wheels; and wherein the band saw has a pair of edges, at least one of which has cutting teeth formed thereon. The edge of the band saw having the cutting teeth thereon is adapted to overhang the respective front edges of the wheels; and preferably, the wheels are substantially flat. The improved band saw of the present invention is substantially free of pre-stress (in its manufacture prior to use) and is hollow (or concavely) formed on at least its inner side and substantially from edge to edge thereof. As a result, the band saw has a cross-sectional thickness with is substantially throughout non-uniform and which decreases substantially uniformly from edge to edge towards the approximate center of the band saw. As a result, a non-uniform radial gap exists between the band saw and each of the wheels, when the band saw is first mounted on the wheels. When the wheels are strained up to bring the band saw into its operative position, the band saw will be stretched and the inner surface of the band saw will become substantially flush against the respective wheels. Accordingly, the necessity for stressing the blade by roll tensioning or the like during its manufacture (or maintenance) is thereby eliminated, since the reduction of mass at the center of the blade between the edges thereof replaces the expansion otherwise required by roll tensioning.

In another embodiment of the present invention, the band saw has a single cutting edge and a complementary back edge or trailing edge formed and dimensioned to have substantially less thickness than the cutting edge. This eliminates the need for the crowned back edge of the prior art saws, since the arcuate taper is geometrically offset relative to a central line. Accordingly, successive sharpening causes the cutting edge to migrate slowly towards the geometrically offset central diminished area of the blade. Thus the thinnest portion in the band saw is caused to become more centralized as a function of time as the saw is sharpened. The thinnest portion of the band saw does not migrate or move. Only the toothed edge is ground away and therefore does the migrating toward the thinnest area. This method of eliminating the crown in single cut band saws (by having the thinnest portion offset from the center) is another advantage of the present invention. With the benefit of the present invention, the tightening sequence of the band saw on the wheel starts at the thickest cross section and ends at the thinnest section either with single or double-cut band saws. The tightening sequence of prior art band saws starts at the edge which has not been expanded by roll tensioning and ends in the central area which has had the most expansion by roll tensioning. With the present invention, the reduction of mass replaces the expansion due to roll tensioning.

In yet another embodiment of the present invention, the band saw has cutting teeth on opposed extremities (when taken in section) and includes a central area of minimal thickness and a gradual increase in thickness from the center to the extremities of the band saw. As a result, the teeth are the only area of the band saw coming in contact with the logs or timbers being cut. In addition, when suitably strained up, the band saw exhibits a natural tendency for the working edge to exhibit zones of greatest tautness in a natural manner, so that minimal stressing of the band saw is required to achieve attachment of the band saw on the band mill. This reduces the amount of built in stress. By having the cutting teeth in the area of the band saw which is stretched first (when strained up on the band mill) tension at that area is followed by a normal gradually reduced tension towards the center of the band saw. The center of the band saw can accommodate this reduced tension, not only by its diminished dimension, but also by its contouring. As a result, stress build-up is minimized and the lines of stress associated with the band saw are dispersed in the proper manner. This reduces the likelihood of bulging, buckling or warping caused, for example, by excessive heat build-up.

As distinguished from the known prior art, the present invention provides either hollow-formed band saws or taper-formed band saws so as to substantially eliminate the present method of roll tensioning and crowned wheels. This substantially eliminates the concomitant tension gradient of the band saws and sash gang saws currently available in the prior art. By having the dimension of the band saw or sash gang saw pre-configured (as hereinafter set forth) the appropriate tensioning of the band saw is programmed into the band saw itself when mounted on the wheels. Virtually none of the elasticity of the steel by roller tensioning is lost, and thereby the life of the steel band saw is extended due to the diminished pre-use flexure. By having the major body portion of the band saw formed with a hollow taper, a concomitant decrease in the amount of clearance between the points of adjacent teeth may be realized, so that substantially less material will be removed during the cutting process. As a result, less cutting pressure and faster feed rates may be obtained. The geometry of the band saw, when mounted on the wheels, exhibits an improved geometrical strength by its preformed nature to thereby resist buckling resulting in greater cut accuracy. When the accuracy improves, the yield from the raw material improves considerably. Also, when less clearance is needed, a narrower chip is removed from the cut so that the sawdust holding gullets of the teeth are utilized to better advantage. The chip size is converted from a wider chip to a longer chip for an increased rate of feed than that which is now possible. The gullets are thus able to carry out more of the sawdust without spilling it from the sides of the band saw while in the cut. This further reduces the friction and heat build-up, heat having the most profound impact on the life of band saws. Since sawdust is removed along the cut, less power is required to move along at the same cut rate, and the teeth associated with the present invention tend to deflect less since the cut is narrower than the prior art.

These and other objects of the present invention will become apparent from a reading of the following specification, taken in conjunction with the enclosed drawings.

BRIEF DESCRIPTION OF THE DRAWINGS

FIG. 1 is a perspective of a portion of an industrial band mill with which the teachings of the present invention may find more particular utility.

FIG. 2 is a schematic side elevation of the band mill wheels with the band saw mounted thereon.

FIG. 3 is a cross-section of a single-edged band saw on the band mill, showing the non-uniform radial gap between the wheel and the hollow-formed (or concavely formed) band saw in the initial position of the band saw on the wheels (as viewed in side elevation).

FIG. 4 is a further cross-section, corresponding substantially to FIG. 3, but showing how the hollow formed band saw becomes substantially flush on the wheel when the wheels are strained up.

DESCRIPTION OF A PREFERRED EMBODIMENT

Figure 5:
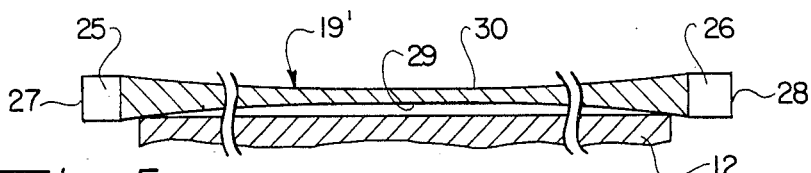
FIG. 5 corresponds substantially to FIG. 3, but shows a non-uniform gap between a flat wheel and a double-edged band saw.

With reference to FIGS. 1 and 2, there is illustrated an industrial band mill 10 with which the teachings of the present invention may find more particular utility. The band mill 10 may be used in a sawmill, a factory producing wood products, or a similar industrial establishment. It will be appreciated, however, that the teachings of the present invention are equally adaptable to other industrial band saws. With this in mind, the band mill includes a frame 11, a pair of wheels constituting a driving wheel 12 and a driven wheel 13, and a band guide 14. A plurality of carriages, one of which is illustrated at 15, carry hydraulically-actuated dogs 16 for gripping a log 17 (or other timber) carried on the carriage. The carriage is guided on rails 18 for advancing the log into the band mill.

With reference again to FIG. 2, and with further reference to FIGS. 3 and 4, a single-edged band saw 19 is mounted on the wheels and has cutting teeth 20 formed thereon.

In accordance with the teachings of the present invention, the band saw 19 is provided with cutting teeth 20 and is hollow (or concavely) formed, at least on its inner side 21, and preferably on its outer side 22 as well. This hollow forming of the band saw is substantially from its leading edge 23 (on which the teeth 20 are formed) to its trailing edge 24, and substantially uniformly thereof. As a result, and as shown more clearly in FIG. 3, a non-uniform radial gap is provided between the band saw and the flat wheel (when viewed in side elevation). When the wheels are strained up, however, the band saw becomes substantially flush against the wheel, as shown more clearly in FIG. 4.

Figure 6:
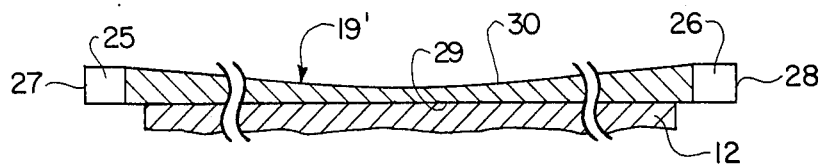
FIG. 6 corresponds substantially to FIG. 5, but shows the band saw substantially flush against the flat wheel when the wheels are strained up.

With reference to FIGS. 5 and 6, the teachings of the present invention are applied to a double-edge band saw 19' mounted on a flat wheel. The band saw 19' has cutting teeth 25 and 26 formed on its front or leading edge 27 and on its rear or trailing edge 28, respectively. The band saw 19' is hollow (or concavely) formed on both its inner side 29 and its outer side 30, respectively. This hollow forming is substantially uniformly from the leading edge to the trailing edge of the band saw 19'. As a result, a substantially non-uniform radial gap is formed between the band saw 19' and each of the wheels and substantially from edge to edge of the band saw. When the wheels are strained up, similarly to the single-edged band saw 19 of FIGS. 3 and 4, the band saw 19' becomes substantially flat against the flat wheel.

Figure 7:
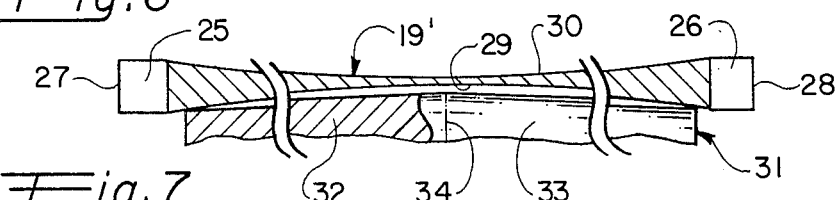
FIG. 7 corresponds substantially to FIG. 5, but shows a non-uniform gap between a crowned wheel and a double-edged band saw.
Figure 8:
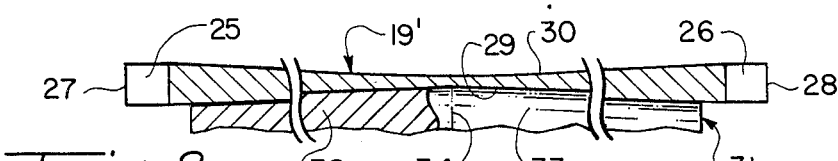
FIG. 8 corresponds substantially to FIG. 7, but shows the double-edge band saw substantially flush against the crowned wheel when the wheel are strained up.

Witn reference to FIGS. 7 and 8, the band saw 19' is applied to a crowned wheel 31. The crowned wheel is formed by tapered portions 32 and 33 having a center ridge 34 therebetween. The application of the band saw 19' to the crowned wheel 31 is substantially identical to the embodiment of FIGS. 5 and 6.

Figure 9:
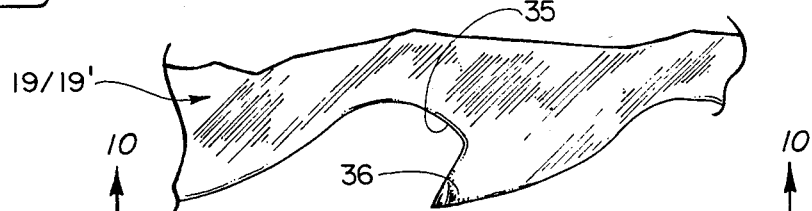
FIG. 9 is a portion of the band saw, showing the gullets and the swaged set teeth of the band saw.
Figure 10:
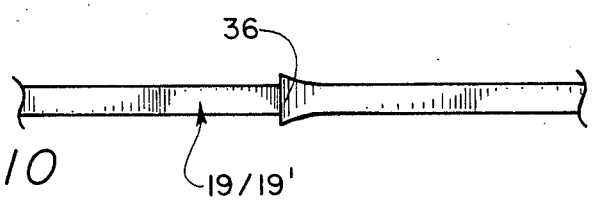
FIG. 10 shows the front edge of the band saw, as viewed along the lines 10—10 of FIG. 9.

With reference to FIGS. 9 and 10, the band saw 19 (or the band saw 19') is provided with gullets 35 between swaged set cutting teeth 36.

Accordingly, with the benefit of the teachings of the present invention, and in particular by the use of hollow forming substantially from one edge of the band saw to the other edge, the pre-stress of the band saw by the use of roll tensioning in its original manufacture or maintenance during the useful life of the blade, may be completed obviated. Highly skilled craftsmen, such as the filers, are no longer necessary for roll tensioning the band saw during the use thereof. Additionally, the band saw may be made thinner than the band saws of the prior art. This saves material costs and, more importantly, results in a thinner kerf, less sawdust, and less wasted material for an additional cost savings.

Obviously, many modifications may be made without departing from the spirit of the present invention. Accordingly, within the scope of the appended claims, the invention may be practiced other than specifically disclosed herein.

What is claimed is:

1. In an industrial band mill, wherein a driven band saw is mounted on a plurality of wheels, each of which is substantially flat and has a front edge, and at least one of which may constitute a driving wheel, wherein the band saw has inner and outer sides and further has a pair of edges, at least one of which has cutting teeth formed thereon, wherein the edge with the cutting teeth overhangs the respective front edges of the wheels, and wherein means are provided for moving the wheels in a direction substantially away from one another, the improvement wherein the band saw is substantially free of pre-stress in its manufacture prior to use, the band saw being concavely formed on at least its inner side and substantially from edge to edge thereof, wherein the band saw has a cross-sectional thickness which is substantially non-uniform throughout and which decreases substantially uniformly from edge to edge towards the approximate center of the band saw, such that there is reduced mass at the center of the band saw between the edges thereof, wherein a non-uniform radial gap exists between the band saw and each of the wheels when the band saw is first mounted on the wheels, and wherein when the wheels are moved away from one another, the band saw will be stretched and the inner surface of the band saw will become substantially flush against the respective wheels in the operative position of the band saw on the band mill, thereby eliminating the necessity for stressing the band saw by roll tensioning or the like during the manufacture thereof; and whereby the reduction of mass replaces the expansion otherwise required by roll tensioning.

2. The improvement of claim 1, wherein the band saw is concavely formed on both sides and from edge to edge thereof.

3. The improvement of claim 1, wherein each of the wheels has an annular surface which is substantially flat when viewed in side elevation, wherein each of the wheels has a front edge and a rear edge, wherein each of the edges of the band saw has cutting teeth formed thereon, and wherein the edges of the band saw overhang the front and rear edges of the wheels, respectively.

4. The improvement of claim 1, wherein the cutting teeth are swaged set.

5. The improvement of claim 1, wherein only one edge of the band saw has cutting teeth formed thereon, and wherein the thinnest part of the band saw is offset from its geometric center.

6. In an industrial band mill, wherein a driven band saw is mounted on a pair of wheels, each of which is substantially flat and has a front edge, and one of which constitutes a driving wheel, wherein the band saw has inner and outer sides and further has a pair of edges, at least one of which has cutting teeth formed thereon, and wherein means are provided for moving the wheels apart to strain up the band saw, the improvement wherein said one edge of the band saw having cutting teeth thereon being adapted to overhang the respective front edges of the wheels, wherein the band saw is substantially free of pre-stress in its manufacture prior to use, the band saw being concavely formed on both sides thereof and substantially from edge to edge thereof, the band saw further having a cross-sectional thickness which substantially is non-uniform throughout and which decreases substantially uniformly from edge to edge towards the approximate center of the band saw, such that there is reduced mass at the center of the band saw between the edges thereof, whereby a non-uniform radial gap exists between the band saw and each of the wheels when the band saw is first mounted on the wheels; wherein when the wheels are moved away from one another, the band saw will be stretched and the inner surface of the band saw will become substantially flush against the respective wheels, thereby eliminating the necessity for stressing the band saw by roll tensioning or the like during the manufacture thereof; whereby the reduction of mass replaces the expansion otherwise required by roll tensioning, and wherein the cutting teeth of the band saw are swaged set.

* * * * *